United States Patent [19]

Krüger et al.

[11] 4,279,758
[45] Jul. 21, 1981

[54] PROCESS FOR INHIBITING THE FORMATION OF MINERAL DEPOSITS FROM A WATER USING N-N-DIALKYLUREIDOMETHANE DIPHOSPHONIC ACIDS

[75] Inventors: Friedrich Krüger, Edingen; Walter Michel, Ilvesheim, both of Fed. Rep. of Germany

[73] Assignee: Joh. A. Benckiser GmbH, Ludwigshafen, Fed. Rep. of Germany

[21] Appl. No.: 192,648

[22] Filed: Oct. 1, 1980

Related U.S. Application Data

[63] Continuation-in-part of Ser. No. 58,806, Jul. 19, 1979, Pat. No. 4,255,572.

[51] Int. Cl.$^3$ .............................................. B01D 21/01
[52] U.S. Cl. ...................................... 210/700; 252/82; 252/180; 252/DIG. 11; 252/525; 252/544; 252/174.16; 260/932
[58] Field of Search ................ 252/180, 544, 525, 82, 252/174.16, DIG. 11; 260/932; 260/700

[56] References Cited

U.S. PATENT DOCUMENTS

| | | | |
|---|---|---|---|
| 3,763,281 | 10/1973 | Weil | 260/932 |
| 3,957,160 | 5/1976 | Ploger et al. | 210/700 |
| 3,989,727 | 11/1976 | Birum | 252/DIG. 11 |
| 4,003,965 | 1/1977 | Birum | 260/932 |
| 4,098,814 | 7/1978 | Sommer et al. | 252/180 X |
| 4,157,364 | 6/1979 | Buckman et al. | 260/932 |

FOREIGN PATENT DOCUMENTS

| | | | |
|---|---|---|---|
| 2260719 | 6/1974 | Fed. Rep. of Germany | 260/932 |
| 2254095 | 5/1975 | Fed. Rep. of Germany | 260/932 |
| 2446749 | 4/1976 | Fed. Rep. of Germany | 260/502.5 |
| 2603702 | 8/1977 | Fed. Rep. of Germany | 260/502.5 |
| 2745084 | 4/1979 | Fed. Rep. of Germany | 260/932 |

*Primary Examiner*—Mayer Weinblatt
*Attorney, Agent, or Firm*—Schwartz, Jeffery, Schwaab, Mack, Blumenthal & Koch

[57] ABSTRACT

A process for inhibiting the formation of mineral deposits from a water using novel N,N'-dialkylureidomethane diphosphonic acids and their alkaline salts having the formula:

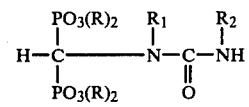

wherein $R_1$ and $R_2$ represent separate alkyl groups having one to three carbon atoms or a ring-forming alkylene group having two or three carbon atoms and R is hydrogen or an alkali metal.

9 Claims, No Drawings

PROCESS FOR INHIBITING THE FORMATION OF MINERAL DEPOSITS FROM A WATER USING N-N-DIALKYLUREIDOMETHANE DIPHOSPHONIC ACIDS

CROSS-REFERENCE TO RELATED APPLICATIONS

This application is a continuation-in-part of co-pending U.S. Patent application Ser. No. 058,806 filed July 19, 1979, now U.S. Pat. No. 4,255,572, issued Mar. 10, 1981.

BACKGROUND OF THE INVENTION

Ureidoalkane diphosphonic acids which are unsubstituted at nitrogen are disclosed in German Pat. No. 2,254,095. These phosphonic acids are readily soluble in water, have good complexing capabilities and are also effective in water treatment.

Ureidoalkane diphosphonic acids are obtained by reacting acyl urea with a mixture of phosphoric acid and phosphorus trichloride at temperatures up to 120 degrees C., preferably in the presence of a neutral solvent, or by heating aminoaklane diphosphonic acids with urea in a stream of dry air or nitrogen according to German Auslegsschrift No. 2,446,749. However, both of these processes are disadvantageous for production of such compounds on an industrial scale, and large quantities of these ureidoalkane diphosphonic acids are difficult to produce.

Despite the efforts of the prior art, there remains a need for better processes of inhibiting the formation of mineral deposits from a water. There is a continuing need for a process which makes use of treatment agents which are more effective than prior art agents and which nevertheless are readily soluble in water and can be produced in a simple and inexpensive manner.

SUMMARY OF THE INVENTION

Now, new, not previously described N,N'-dialkylureidomethane diphosphonic acids and their alkali salts of the general formula

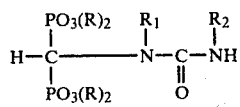
(1)

have been discovered, wherein $R_1$ and $R_2$ represent an alkyl group having one to three carbon atoms or a ring-forming an alkylene group, and R is hydrogen or an alkali metal.

The new phosphonic acids have a better water treating effect than ureidoalkane diphosphonic acids which are unsubstituted at the nitrogen, and they are also readily soluble in water and can be produced in a simpler and less expensive manner.

The new phosphonic acids further possess a very good complexing capability with respect to divalent and multivalent metal ions, such as calcium, magnesium, iron, chromium, manganese and others. Applied in less than stoichiometric amounts, the new phosphonic acids represent excellent means for the stabilization of water hardness. They may be incorporated in solid and liquid products which are to be used in aqueous media. Furthermore, the new compounds are compatible with conventional detergent ingredients so that they may be used in place of, or together with, polyphosphates as "builders" in detergents and cleaning products. It is anticipated that the new phosphonic acids may be useful in all applications where polyphosphates or other complexing agents such as ethylenediamine tetraacetic acid or nitrilotriacetic acid are utilized. The amounts required are substantially the same as with prior art water treating agents.

The invention comprises providing a process for inhibiting the formation of mineral deposits from a water comprising treating the water with an effective amount of a compound selected from the group consisting of N,N'-dialkylureidomethane diphosphonic acids and their alkaline salts having the formula:

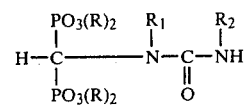

wherein $R_1$ and $R_2$ represent an alkyl group having one to three carbon atoms or a ring-forming alkylene group having two or three carbon atoms and R is hydrogen or an alkali metal.

DETAILED DESCRIPTION OF PREFERRED EMBODIMENTS

The invention will be further understood from a consideration of the following, non-limiting, tests and examples:

Test I

In the following table, as an example, the advantageous suspending action of N,N'-dimethylureidomethane diphosphonic acid and of N,N'-propyleneureidomethane diphosphonic acid in inhibiting the formation of calcite deposits according to the invention are shown in comparison with that of ureidomethane diphosphonic acid which is not substituted at the nitrogen and with aminomethane diphosphonic acid.

To determine the water treatment effect (threshold effect) in the alkaline range, a certain amount of the substance to be tested was dissolved in 1 liter water of 17.5 degrees dH in a 1 000 ml glass beaker and 12 g sodium hydroxide were added. The beaker was covered with a watch glass and allowed to stand at room temperature. Subsequently, it was ascertained whether crystals were deposited on a glass rod or on the wall of the glass beaker.

TABLE I

| | Stabilizing Effect in the Alkaline Range | | | | | |
|---|---|---|---|---|---|---|
| Phosphonic Acid | Amount mg | 2 | 4 | 6 | 8 | 10 days |
| N,N-dimethyl- | 3.5 | 0 | — | — | — | — |
| ureidomethane | 5.0 | 0 | 0 | — | — | — |
| diphosphonic acid | 10.0 | 0 | 0 | 0 | 0 | — |
| N,N'-propylene- | 3.5 | — | — | — | — | — |
| ureidomethane | 5.0 | 0 | — | — | — | — |
| diphosphonic acid | 10.0 | 0 | 0 | 0 | — | — |
| Ureidomethane | 3.5 | — | — | — | — | — |
| diphosphonic | 5.0 | — | — | — | — | — |
| acid | 10.0 | 0 | 0 | — | — | — |
| Aminomethane | 3.5 | — | — | — | — | — |
| diphosphonic | 5.0 | — | — | — | — | — |
| acid | 10.0 | — | — | — | — | — |

0 = no deposition
— = onset of precipitation of calcite crystals

Test II

The N,N'-disubstituted ureidomethane diphosphonic acids in the neutral range also have a superior stabilizing effect in comparison to ureidomethane diphosphonic acids which are not substituted at the nitrogens. They are therefore suitable for stabilizing water circulating in cooling systems. The above-mentioned stabilizing effect in the neutral range is shown in Table II.

For this purpose, 100 ml water of known hardness was mixed with 2.0 mg of the substance to be tested, adjusted to pH 7 and maintained in a warming cabinet at 80 degrees C. for 16 hours. The solution was then made up to 100 ml with distilled water, filtered through a doubled filter paper, and the residual hardness of the filtrate was determined and converted to mval alkaline earth metal ions per liter according to DIN 19640 (1 mval alkaline earth metal ions=2.8 degrees dH).

TABLE II

| Stabilizing Effect in the Neutral Range | | |
|---|---|---|
| Phosphonic Acid | mval alkaline earth metal ions | Percentage inhibition |
| N,N'-dimethylureidomethane diphosphonic acid | 6.32 | 96.20 |
| N,N'-dipropyleneureidomethane diphosphonic acid | 6.29 | 95.65 |
| Ureidomethane diphosphonic acid | 4.2 | 63.6 |

Test III

The ability of N,N'-dimethylureidomethane diphosphonic acid according to the invention to form complexes with magnesium ions in comparison to the corresponding ability of ureidomethane diphosphonic acid and monomethylureidomethane diphosphonic acid was determined as follows. One gram of the test substance was dissolved in 60 ml of water, and the pH of the resulting solution was adjusted to 11.5 by adding sodium hydroxide with stirring. The resulting clear solution was mixed with 10 ml of a 2% soda solution. A 0.25 mole magnesium acetate solution was then added dropwise until a permanent turbidity was produced, i.e., the numbers and letters on a card placed behind the glass beaker containing the solution could no longer be read through the solution. The results of the test are summarized in the following Table III.

TABLE III

| Complex Forming Ability with Magnesium Ions | | |
|---|---|---|
| Test Substance | Milligrams Magnesium per Grams of Test Substance | Moles of Magnesium per Mole of Test Substance |
| N,N'-dimethylureidomethane diphosphonic acid | 461 | 4.97 |
| Ureidomethane diphosphonic acid | 196 | 1.89 |
| Monomethylureidomethane diphosphonic acid | 366 | 3.73 |

Test IV

The ability of N,N'-dimethylureidomethane diphosphonic acid according to the invention to form complexes with ferric ion (Fe III) was determined in comparison with the corresponding ability of ureidomethane diphosphonic acid and monomethylureidomethane diphosphonic acid. The determination was accomplished according to the Rhodanid method in the pH range from 2 to 2.5. For this purpose, 100 milligrams of the test substance was dissolved in 50 ml of distilled water in a 100 ml glass beaker provided with a magnetic stirrer. Then 1 ml of 0.1 N hydrochloric acid (HCl) and 1 ml of 0.1 N ammonium thiocyanate (NH$_4$CNS) solution and titrated under continued stirring with 0.1 mole ferric chloride (FeCl$_3$) until a persistent red-brown color appeared. The results of the test are shown in the following Table IV.

TABLE IV

| Complex Forming Ability with Ferric Ion (Fe$^{+3}$) | | |
|---|---|---|
| Test Substance | Milligrams Ferric Ion per 100 Grams Test Substance | Gram-Atoms Ferric Ion per Mole of Test Substance |
| N,N'-dimethylureidomethane diphosphonic acid | 33.51 | 1,572 |
| Ureidomethane diphosphonic acid | 27.59 | 1,156 |
| Monomethylureidomethane diphosphonic acid | 28.99 | 1,287 |

The N,N'-dialkylureidomethane diphosphonic acids according to the invention are produced by reacting formic acid with dialkylurea and phosphorus trichloride.

The preparation of phosphonic acids from formic acid is not reported in the literature. Only derivatives of formic acid, for example formamide or HCN, have heretofore been utilized in the preparation of aminomethane diphosphonic acids.

It was therefore surprising that the N,N'-dialkylureidomethane diphosphonic acids may be prepared from the three components: formic acid, dialkyl urea and phosphorus trichloride so smoothly and in such good yields.

Useful N,N'-dialkylureidomethane diphosphonic acids include N,N'-dimethylureidomethane diphosphonic acid, N,N'-diethylureidomethane diphosphonic acid, N,N'-dipropylureidomethane diphosphonic acid, N,N'-diisopropylureidomethane diphosphonic acid, N,N'-ethyleneureidomethane diphosphonic acid, and N,N'-propyleneureidomethane diphosphonic acid which are prepared respectively from dimethylurea, diethylurea, diproplyurea, diisopropylurea, N,N'-ethyleneurea and N,N'-propyleneurea.

The preparation of the new phosphonic acids is advantageously effected by mixing formic acid and the N,N'-disubstituted urea and adding phosphorus trichloride dropwise to the mixture. Preferably, prior to the addition of PCl$_3$, the mixture of formic acid and the N,N'-dialkylurea is heated to approximately 80 degrees C. It is also possible, however, to slowly drip the PCl$_3$ into the mixture without preheating. During the addition of the PCl$_3$, the internal temperature slowly rises to a maximum of 125 degrees C. and then slowly declines. Subsequently the heating is continued until no reflux is observed and the development of gaseous HCl has ceased. A white syrup readily soluble in water is obtained. The syrup may be caused to crystallize with a small amount of water. To obtain complete crystallization, the concentrated aqueous solution may be poured into glacial acetic acid or into an organic solvent such as acetone. The pure white crystalline phosphonic acid is obtained in the process in yields exceeding 80%.

EXAMPLE 1

88.11 g (1.0 mole) N,N'-dimethyl urea and 88.55 g (1.75 mole) formic acid are combined and heated to 80 degrees C. under vigorous agitation. To this mixture, 151.03 g (1.1 mole) phosphorus trichloride are added dropwise over approximately 30–40 minutes. The internal temperature rises during the process to approximately 125 degrees C. and then declines slowly. After reaching approximately 75 degrees C., heating is continued in a boiling water bath until there is no reflux and the development of gaseous HCl has ceased. A white, foamy syrup in the amount of 175 g is obtained, which is then diluted with 50 ml water. The resulting solution is poured into 300 ml of 100% acetic acid. After a short period of stirring, the pure, white crystals are removed by vacuum filtration. After washing and drying, 116.25 g N,N'-dimethylureidomethane diphosphonic acid are obtained.

The yield is 80.7% of theoretical with respect to $PCl_3$.

| Analysis | |
|---|---|
| Calculated: | N 10.68%; P 23.66%; |
| Found: | N 10.6%; P 23.2% |
| Melting Point: | 187 degrees C. |

EXAMPLE 2

100.1 g (1.0 mole) propylene urea and 81.0 g (1.75 mole) formic acid are premixed at 70 degrees C. with agitation. To the reaction mixture, 164.8 g (1.2 mole) phosphorus trichloride are added dropwise over approximately 30 minutes. In the process, the temperature rises to approximately 115 degrees C. and then slowly declines. This is followed by agitation for one hour in a boiling water bath. To the warm solution, 160 ml water are added. The solution may be used directly.

To isolate the phosphonic acid, the aqueous solution is poured into 100% acetic acid. After a brief period of standing the resulting crystals are removed by vacuum filtration, washed and dried.

The yield is 40 g of N,N'-propyleneureidomethane diphosphonic acid.

| Analysis | |
|---|---|
| Calculated: | N 10.2%; P 22.6% |
| Found: | N 10.0%; P 22.2% |

EXAMPLE 3

A series of glass bottles were washed and rinsed with a 1% aqueous sodium hydroxide solution containing 0.2% (by weight) of a cleaning composition comprising 10% N,N'-dimethylureidomethane diphosphonic acid, 50% phosphoric acid (75% solution), 20% anti-foam agent (a block copolymer of ethylene oxide and propylene glycol sold by Wyandotte Chemical Company under the trade name Pluronic L 61) and 20% water. After washing and rinsing, the bottles were clear and spot-free.

EXAMPLE 4

Milk processing equipment was washed and rinsed with a 0.5% aqueous solution comprising (by weight) 5% N,N'-dimethylureidomethane diphosphonic acid, 17% sodium silicate ($Na_2SiO_3$), 12% soda, 1% trialkyl benzyl ammonium chloride, 1% tallow (stearin) alcohol with 25 ethylene oxide sold by BASF under the trademark Lutensol ST 25, 5% sodium perborate-monohydrate 5% sodium tripolyphosphate, 54% anhydrous sodium sulfate. The washed and rinsed milk processing equipment was sparkling clean and free from mineral deposits.

EXAMPLE 5

Dishes were washed in a dishwashing machine utilizing 3 grams per liter of a washing medium comprising (by weight) 7% N,N'-dimethylureidomethane diphosphonic acid, 62% sodium metasilicate, 30% trisodium citrate and 1% anti-foam agent Pluronic L 61 (Wyandotte). There was no evidence of any corrosion or other adverse effect on the decorative appearance of the dishes and there was no spotting or coating evident on the glass surfaces.

EXAMPLE 6

Laundry was washed in an automatic washing machine using hard water having a hardness up to 18 degrees dH at a temperature of 60 degrees C. and containing a concentration of 4 grams per liter of a washing medium comprising (by weight) 5% N,N'-dimethylureidomethane disphosphonic acid, 10% trisodium citrate, 2.5% sodium hydroxide (NaOH), 30% of a 50% aqueous solution of a linear alkylbenzol sulfonate sold by BASF under the trademark Lutensit ALBN, 2.5% of a linear fatty alcohol having carbon chains containing from 11 to 13 carbon atoms condensed with 6 moles of ethylene oxide sold by BASF under the trademark Lutensol ON 60, 2.5% of a linear fatty alcohol having a carbon chain containing from 13 to 15 carbon atoms condensed with 8 moles of ethylene oxide sold by BASF under the trademark Luntensol A 08, 6% of a solubility enhancer (sodium cumiol sulfonate), 2% 1,2-propylene glycol, 2% cocos fatty acid diethanol amide sold by Huels under the trademark Marlamid D1218 and 37.5% water. After repeated washings, there was no apparent graying of the laundry, and there were no discernible mineral deposits on the laundry or the washing machine.

EXAMPLE 7

Laundry was washed in an automatic washing machine using water of various hardnesses at a temperature of 60 degrees C. containing 4 grams per liter of a detergent composition comprising (by weight) 10% N,N'-dimethylureidomethane disphosphonic acid, 5% sodium hydroxide (NaOH), 30% Lutensit ALBN (50% solution), 2.5% Lutensol ON 60, 2.5% Lutensol A 08, 2% Marlamid D 1218, 5% sodium cumol sulfonic acid, 2% 1,2-propylene glycol and 41% water. After repeated washings, no mineral deposits were discernible either on the laundry or on the washing machine.

The foregoing description and examples have been set forth as illustrative of the invention and are not intended to be limiting. Since modifications of the disclosed embodiments within the scope and spirit of the invention may occur to persons skilled in the art, the scope of the invention is to be limited only by the scope of the appended claims.

We claim:

1. A process for inhibiting the formation of mineral deposits from a water comprising treating the water with an effective amount of a compound selected from the group consisting of N,N'-dialkylureidomethane diphosphonic acids and their alkaline salts having the formula:

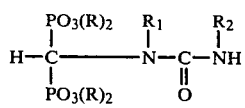

wherein $R_1$ and $R_2$ represent an alkyl group having one to three carbon atoms or a ring-forming alkylene group having two or three carbon atoms and R is hydrogen or an alkali metal.

2. Process according to claim 1 wherein $R_1$ and $R_2$ are each methyl.

3. Process according to claim 1 wherein $R_1$ and $R_2$ together represent a ring forming propylene group.

4. Process according to claim 1 wherein $R_1$ and $R_2$ are each ethyl.

5. Process according to claim 1 wherein $R_1$ and $R_2$ are each isopropyl.

6. Process according to claim 1 wherein $R_1$ and $R_2$ together represent a ring forming ethylene group.

7. Process according to claim 1 wherein said N,N'-dialkylureidomethane diphosphonic acid comprises part of a detergent composition.

8. Process according to claim 7 wherein said N,N'-dimethylureidomethane diphosphonic acid comprises from about 5 to about 10% of said detergent composition.

9. Process according to claim 1 wherein said water contains ions of at least one element selected from the group consisting of calcium, magnesium and iron.